A. SZABO.
APPARATUS FOR USE IN SHOEING HORSES.
APPLICATION FILED NOV. 1, 1921.
1,420,349.  Patented June 20, 1922.
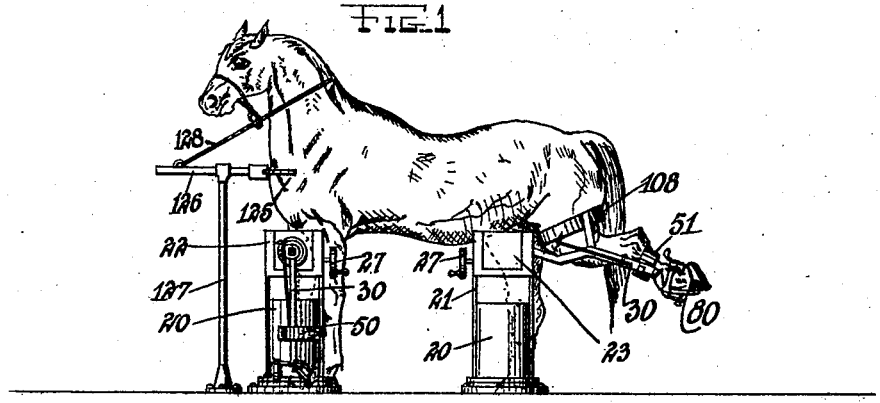
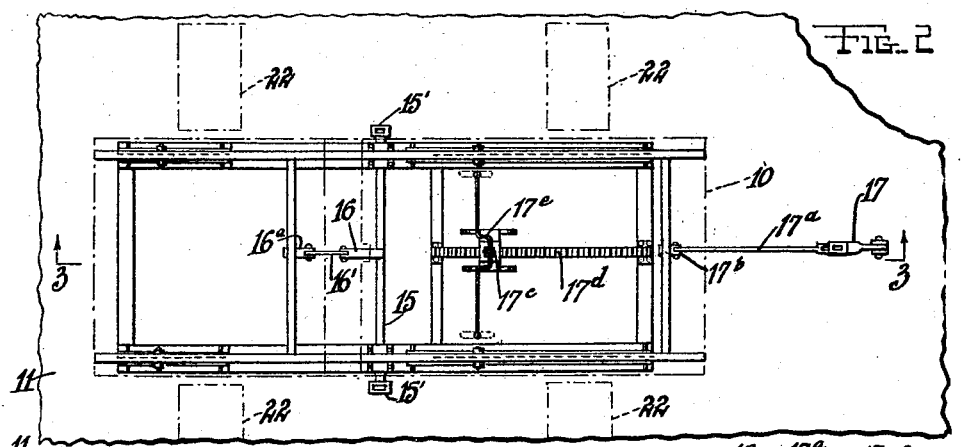

A. SZABO.
APPARATUS FOR USE IN SHOEING HORSES.
APPLICATION FILED NOV. 1, 1921.
1,420,349.
Patented June 20, 1922.
3 SHEETS—SHEET 2.
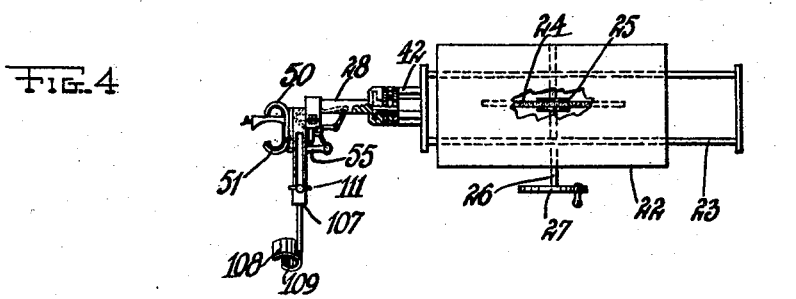
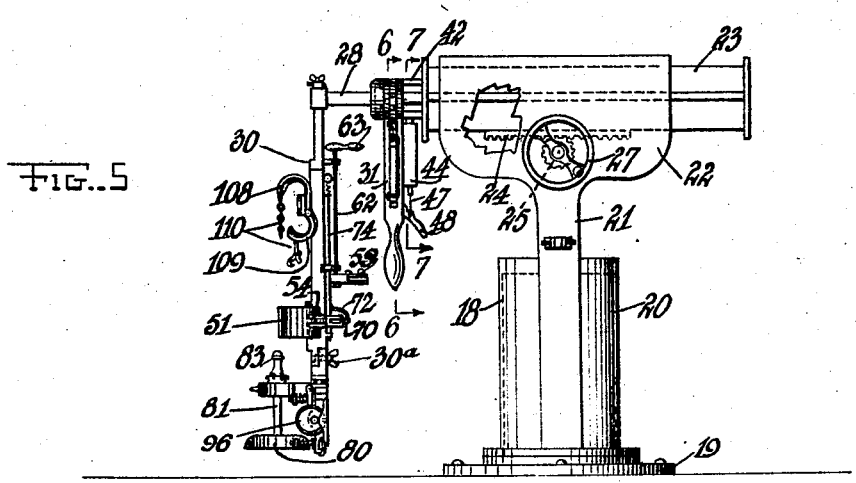
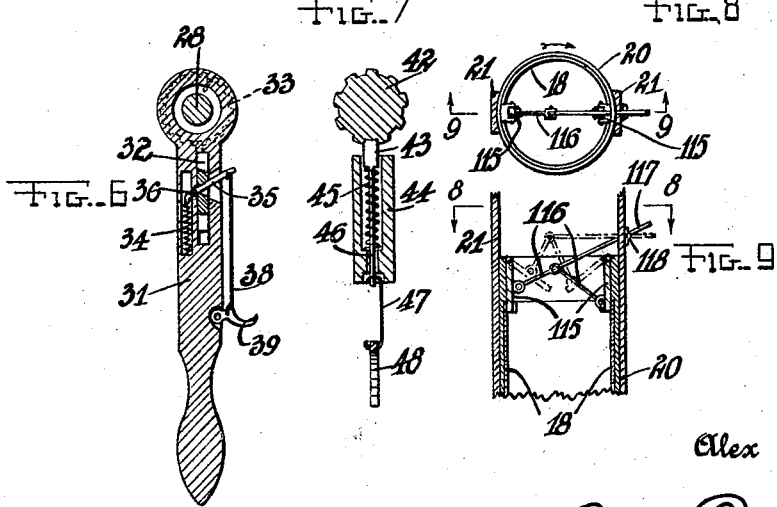
Inventor
Alex Szabo
By Zoltan N. Polacheck
Attorney A. SZABO.
APPARATUS FOR USE IN SHOEING HORSES.
APPLICATION FILED NOV. 1, 1921.
1,420,349.
Patented June 20, 1922.
3 SHEETS—SHEET 3.
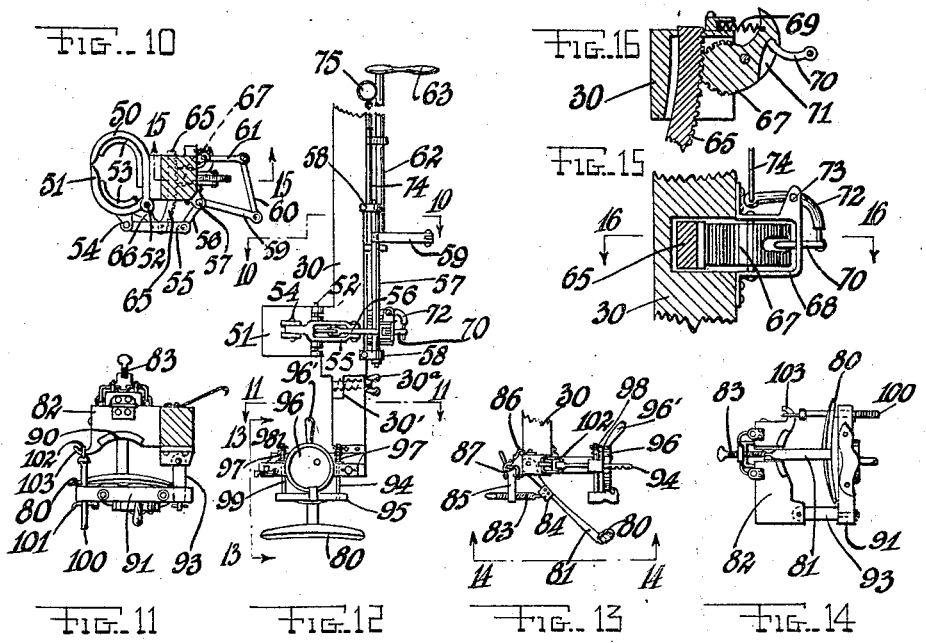
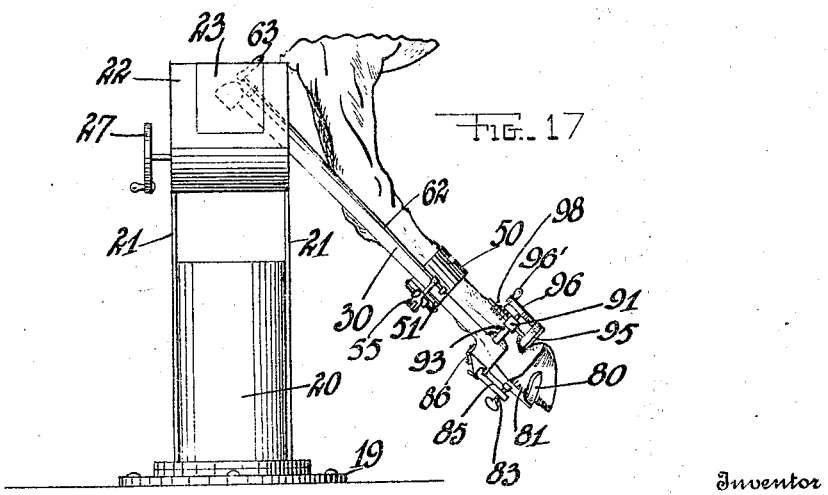
Inventor
Alex Szabo
By
Attorney

UNITED STATES PATENT OFFICE.

ALEX SZABO, OF PERTH AMBOY, NEW JERSEY.

APPARATUS FOR USE IN SHOEING HORSES.

1,420,349. Specification of Letters Patent. Patented June 20, 1922.

Application filed November 1, 1921. Serial No. 512,011.

*To all whom it may concern:*

Be it known that I, ALEX SZABO, citizen of Hungary, residing at Perth Amboy, in the county of Middlesex and State of New Jersey, have invented certain new and useful Improvements in Apparatus for Use in Shoeing Horses, of which the following is a specification.

This invention relates generally to implements used in connection with the shoeing of horses, having more particular reference to a device for holding the hoof being shod in the proper turned up position.

The invention has for an object to provide a device of this sort whereby the leg of the animal being shod may be securely held in the proper position with the sole of the hoof turned up for shoeing.

A further object is to provide a device which can be engaged with the leg of the animal while the leg is in normal position and which will raise it to the desired position.

For further comprehension of the invention, and of the objects and advantages thereof, reference will be had to the following description and accompanying drawings, and to the appended claims in which the various novel features of the invention are more particularly set forth.

Fig. 1 of the drawings is a side elevation of my improved apparatus, showing it with one of the hind leg holding devices in actual use.

Fig. 2 is a plan view of the movable support on which the horse rests.

Fig. 3 is a longitudinal vertical section on the line 3—3 of Fig. 2.

Fig. 4 is a plan view, with parts broken away, of one of the leg holding devices.

Fig. 5 is a vertical elevation thereof at right angles to Fig. 1.

Fig. 6 is an enlarged detail transverse section taken on the line 6—6 of Fig. 5 and illustrating particularly the arrangement of the raising handle.

Fig. 7 is an enlarged detail transverse section on the line 7—7 of Fig. 5 and illustrating particularly the means for locking the leg holding arm.

Fig. 8 is a horizontal section through the support for the leg holding device.

Fig. 9 is a fragmentary vertical sectional view of the said support, this view being taken along the line 9—9 of Fig. 8.

Fig. 10 is a detail transverse section through the leg holding arm this view being taken along the line 10—10 of Fig. 12.

Fig. 11 is a transverse section on the line 11—11 of Fig. 12.

Fig. 12 is a side elevation of the leg holding device.

Fig. 13 is a fragmentary side view, at right angles to Fig. 12, of the hoof engaging portion of the hoof engaging devices.

Fig. 14 is an underside plan view, as indicated by the line 14—14 on Fig. 13, of the parts as shown in Fig. 13.

Fig. 15 is a fragmentary longitudinal sectional view, through the leg holding arm and showing particularly the locking means for the leg grippers, this view being taken on the line 15—15 of Fig. 10.

Fig. 16 is a transverse sectional view taken along the line 16—16 of Fig. 15.

Fig. 17 is a side view of the device for holding the front leg of the animal, showing it as in actual use.

In the embodiment of the invention here shown I provide a platform 10 on which the horse stands and which is arranged to have longitudinal movement to bring the horse between the leg holding members. This platform is located flush with the floor 11 of the blacksmith shop in a suitable recess or depression 12 formed therein. The platform is supported on wheels 13 running on tracks 14. To move the platform 10 a rockshaft 15 extends thereunder and has fixed thereto an arm 16 connected by a link 16' to a bracket 16ª fixed to the platform 10. Upon the opposite ends of shaft 15 a pair of socket elements 15' are fixed to receive suitable operating handles. Similarly, at the rear end of the platform, an arm 17 is connected by a link 17ª to a bracket 17ᵇ on the platform, the arm 17 being socketed to receive an operating handle. The platform is locked by means of a vertically movable bolt 17ᶜ engaging a notched bar 17ᵈ and lifted by a suitable crank device 17ᵉ.

Located on the floor 11 beside the platform 10 are the devices for engaging the horse's leg to raise the latter to, and hold them in, the proper position, there being two of these devices, one for the front leg and one for the rear leg, at each side of the platform 10, the positions occupied by these devices with respect to the platform being indicated by the dotted rectangles 22 in Fig. 2.

Each of these devices comprises a hollow pedestal 18 provided with a flanged base 19 fixed to the floor 11 and having fitting freely thereover a tubular standard 20 having upwardly extending side elements 21 supporting a horizontally arranged guide head 22. In this head is slidably supported a slide 23 carrying the leg holding arm. This slide 23 has a rack 24 on its underside engaged by a pinion 25 fixed on a shaft 26 journaled in the head 22. Shaft 26 has a handwheel 27 fixed on one end whereby the pinion 25 may be rotated to move the slide 23, transversely to the platform 10, into or out of proper engaging relation to the leg of the animal.

The head 22 has rotatably engaged therein a circular bar 28 to the outer end of which an arm 30 is fixed. To swing the arm 30 to desired positions I provide a handle 31 freely engaged over the bar 28 and having longitudinally slidable therein a pawl 32 adapted to engage a square toothed ratchet wheel 33 fixed to the bar 28. The pawl 32 is normally held in engagement with the ratchet wheel 33 by a tension spring 34 located in a recess in the handle 31 and engaging one end of a lever 35 fulcrumed between its ends as at 36 in the handle. This lever 35 passes through a flaring slot 37 in the pawl 32 and has connected to its opposite end a link 38 which connects it with a finger lever 39 pivoted in the handle 31. As will be apparent, the arm 30 can be swung to any desired position by the handle 31, whose relation to the arm can be changed by releasing pawl 32 and swinging the handle on the bar 28.

To lock the arm 30 in adjusted position the slide 23 has fixed thereto a square toothed ratchet wheel 42 adapted to be engaged by a pawl 43 slidably carried in a guide element 44 formed on one face of the handle 31. This pawl 43 is urged to locking position by means of a coiled expansion spring 45 surrounding a stem 46 on the pawl, this stem being connected by a link 47 with a second finger lever 48 pivoted on handle 31. By pressing on finger lever 48 the pawl 43 may be withdrawn from the ratchet 42 to release arm 30.

The leg of the animal is adapted to be gripped, a short distance below the knee, by a pair of curved gripper fingers 50, 51, the finger 50 being fixed to the arm 30 and the finger 51 pivoted as at 52 upon the finger 50. The inner faces of these fingers are covered with pads 53 of rubber or felt. To swing the finger 51 into and out of gripping position, an ear 54 is formed thereon and has connected thereto one end of a link 55 whose opposite end is connected to an arm 56 on the lower end of a shaft 57 extending along the arm 30 and journaled in suitable bearing lugs 58. Fixed to the upper end of shaft 57 is a second arm 59 which has connected thereto a link 60 connected also to an arm 61 on the lower end of a second rock-shaft 62 supported on the arm 30, this rock-shaft 62 having a handle 63 fixed to its upper end whereby it may be rotated to open or close the gripper finger 51. To lock the latter in closed position a square-toothed arcuate ratchet bar 65 is pivotally connected at one end to a second ear 66 on the finger 51 and extends freely through a suitable recess in the arm 30. This bar 65 is engaged by a locking pawl 67 pivoted in a U-bracket 68 fixed to the arm 31 and pressed against the bar by a spring 69. The pawl 67 may be released by means of a push-link 70 engaged in a recess 71 in the pawl and being attached to one end of a bell-crank lever 72 pivoted as at 73 on the bracket 68, the other end of this lever 72 having connected thereto a link 74 extending along the arm 30 and provided with a handle 75. When this handle is pulled the push-link 70 presses against the pawl 67 and swings the latter away from the ratchet bar 65.

When the leg of the animal is in position, the front of the hoof is engaged by an arcuate cross-piece or saddle 80 formed on the outer end of a short link 81 pivoted at its other end to a block 82 offset from the lower end of the arm 30 and extending longitudinally beyond the latter. The arm 30 is preferably formed in two sections connected together by a hinge joint 30' locked by a screw 30ª the parts now being described being carried by the lower section. This saddle 80 is held in engagement with the hoof by means of a screw 83 having a rounded end engaging freely in a socket 84 on the back of link 81, this screw being threaded through a bracket 85 hinged as at 86 to the block 82 and releasably locked by means of hinged claws 87 engaging suitable hooks on said block.

The offset block 82 engages the leg of the animal just above the hoof, being concavely curved to fit the leg and provided with a pad 90 of rubber or felt. To keep the hoof in proper position on the saddle 80 a frame piece 91 is hinged as at 92 to a link 93 pivoted at its opposite end to one end of the block 82, the frame piece 91 swinging transversely to the link 93. This frame piece has slidably passed therethrough a pair of rods 94 having a cross-piece 95 fixed to their lower ends. This cross-piece engages in the pastern of the animal and is adapted to be pressed against the heel of the hoof by means of a cam disk 96 mounted on the cross-piece and provided with a turning handle 96'. The cross-piece is normally urged in an opposite direction by means of a pair of coiled expansion springs 97 surrounding the rods 94 and bearing between the frame piece 91 and disks 98 fixed on the upper ends of the rods. The frame piece 91 is held in proper position by means of a rod 100 passing through the frame piece and having a series of longitudinally spaced notches engaged by a latch 101 hinged to the frame piece, the rod 100 having a suitable hinged eye 102 on its end which takes over a hook 103 on the block.

As thus far described the devices for engaging the front and rear legs of the animal are of identical construction but in addition the devices which engage the rear legs have fixed offsets 107 from the arms 30 which carry gripper fingers 108, 109, similar in the main to the fingers 50, 51 and adapted to be locked to one another by suitable hook and chain means 110. The offsets 107 preferably comprise telescopic sections locked together by a nut and screw device 111.

The standard 20 is locked to the pedestal 18 by means of a pair of latches 115 hinged to the former and adapted to engage notched elements on the latter, these latches being operated by means of links 116 hinged thereto and to each other, one of said links being extended as at 117 to form an operating handle which is pivoted as at 118 to one of the members 21.

It is believed that the manner of operation and use of my improved apparatus will be readily understood from the above description. The animal to be shod is led on the platform 10 when the latter is in a position at the right hand of the recess 12. The platform is then moved to the opposite end of the recess, bringing the animal into proper position with respect to the leg holding devices. In applying the latter, the guide head 22 is swung around on the pedestal 18, until the slide 23 is transverse to the animal, and then locked by the latches 116. Wheel 27 is then rotated to advance the arm 30 toward the leg of the animal. The gripper fingers 50, 51 are engaged with the leg and the arm 30 swung upwardly by means of handle 31. The saddle 80 and cross-piece 95 are then engaged with the hoof and hock, holding the hoof in proper position for shoeing.

To position the animal properly on the platform 10 a breast yoke 125 is provided on one end of a rod 126 on a post 127, a rope 128 being attached to the rod for securing the head of the animal.

Having thus described my invention what I claim as new and desire to protect by Letters Patent of the United States is as follows:

1. In an apparatus of the type described, a device adapted to engage and hold the leg of an animal, a tubular pedestal therefor, a tubular standard surrounding and revoluble on said pedestal and carrying said device, and means for locking said standard against rotation on said pedestal, said means comprising a pair of latch-bolts pivoted to the standard and adapted to engage in notches in the pedestal, and a pair of links connected to the respective latch-bolts and to each other, one of said links being extended to form an operating handle.

2. In an apparatus of the type described, a guide head, a slide guided therein, means for moving said slide longitudinally in said guide head, and a swingable arm provided with leg engaging means mounted on said slide, and means mounting said guide head to permit of revolution thereof in a horizontal plane comprising a pedestal, and a tubular standard surrounding and revoluble on said pedestal and carrying said guide head.

3. In a device of the class described, an arm adapted to swing in a vertical plane, and a pair of leg gripping fingers on said arm, one of said fingers being fixed, and the other being swingable, and means for locking said swingable finger comprising an ear fixed thereto, an arcuate ratchet bar pivotally connected to said ear and projecting through a transverse slot in said arm, and a spring-pressed pawl engaging said ratchet bar.

4. In a device of the class described, an arm adapted to swing in a vertical plane, gripping means adapted to engage the leg of an animal, and support adapted to engage the front of the hoof, said support comprising a saddle piece, a hinged arm on which said saddle piece is mounted, and an abutment screw adjustably bearing on said arm.

5. In a device of the class described, an arm adapted to swing in a vertical plane, gripping means adapted to engage the leg of an animal, a support adapted to engage the front of the hoof and a clamp member adapted to engage the pastern of the animal.

6. In a device of the class described, an arm adapted to swing in a vertical plane, gripping means adapted to engage the leg of an animal, a support adapted to engage the front of the hoof and a clamp member adapted to engage the pastern of the animal, said clamp member comprising a pair of slidable rods, a cross-piece thereon, and a rotatable cam disk adapted to bear on said cross-piece.

In testimony whereof I have affixed my signature.

ALEX SZABO.